US006989613B2

(12) United States Patent
Andrews et al.

(10) Patent No.: US 6,989,613 B2
(45) Date of Patent: Jan. 24, 2006

(54) LINE VOLTAGE VARIATION COMPENSATION APPARATUS

(76) Inventors: George R. Andrews, 11440 E. Pine St., Tulsa, OK (US) 74116; Frank Izbinski, 10221 Green St., Temple City, CA (US) 91780

( * ) Notice: Subject to any disclaimer, the term of this patent is extended or adjusted under 35 U.S.C. 154(b) by 273 days.

(21) Appl. No.: 10/699,391

(22) Filed: Nov. 3, 2003

(65) Prior Publication Data

US 2005/0093375 A1 May 5, 2005

(51) Int. Cl.
*H01H 35/00* (2006.01)

(52) U.S. Cl. ...................... 307/130; 307/112; 307/125; 323/259

(58) Field of Classification Search ................ 307/112, 307/125, 130; 323/259
See application file for complete search history.

(56) References Cited

U.S. PATENT DOCUMENTS 5,883,503 A * 3/1999 Lace .......................... 323/259

* cited by examiner

*Primary Examiner*—Robert L. Deberadinis

(57) ABSTRACT

Circuit apparatus for interconnection between an electric power source of expected variability and an recreation vehicle requiring a known fixed range of voltage change. A voltage sensor (18) for producing signals representative of corresponding source voltage variation ranges. A transformer (60) with tapped primary (56,58) is selectively switched to provide low boost or high boost to compensate two low ranges of the source voltage connected by a relay (54) energized by the voltage sensor signals (18). If the source voltage exceeds the low boost range, a further relay (28) energized by a sensor signal connects the source voltage to output terminals (40,42) for ultimate use.

5 Claims, 1 Drawing Sheet

LINE VOLTAGE VARIATION COMPENSATION APPARATUS

BACKGROUND OF THE INVENTION

The present invention relates generally to apparatus for monitoring line voltage and compensating for low line voltage values.

DESCRIPTION OF RELATED ART

Public electrical power service is found to vary from expected voltage norms throughout the day dependent primarily upon magnitude of usage of electrical power throughout the associated community. For example, typically in the morning as heavy electric usage begins in both industry and domestic dwellings, the outskirts of the community will particularly experience lower than normal voltages. On the other hand, as overall power usage in the community is reduced at night, the line voltage will rise. Actual line voltage measurements have shown that the customary "120" volt line service in the U.S. may vary from 90 to 130 VAC.

The effects of voltage value change can be particularly damaging in so-called RV (recreation vehicle) vehicles that frequently are located at the end of electric transmission lines (e.g., in remote country areas) due to the relatively greater line loss. If not compensated for in some manner, such voltage variations can cause either undesirably lower level operation of electrical equipment or excessively high electric current (heat) that can damage equipment or produce fire in the RV.

Systems that can produce full regulation of a source voltage are well known, however, they are expensive and complex to manufacture especially where relatively high power output is to be handled. Compensation systems involving transformer switching generally are available, but all those known are unsatisfactory in one way or another.

It is, therefore, desirable to provide compensation for lowered source voltage variation resulting in a compensated voltage of a satisfactory usable range for typical household electrical equipment.

SUMMARY OF THE INVENTION

In accordance with the practice of the present invention, there is provided circuit apparatus for interconnection with a source of electric power of expected periodic voltage variability and including voltage sensor means for producing signals representative of corresponding ranges of source voltage variation. A transformer with a tapped primary is selectively switched to provide a low boost and a high boost for compensating two low ranges of the source voltage as connected via a relay appropriately energized by the voltage sensor signals. On the source voltage exceeding the low boost voltage range, a further relay energized by a voltage sensor signal to directly interconnect the source voltage to circuit apparatus output terminals for ultimate use.

DESCRIPTION OF A PREFERRED EMBODIMENT

Figure 1:
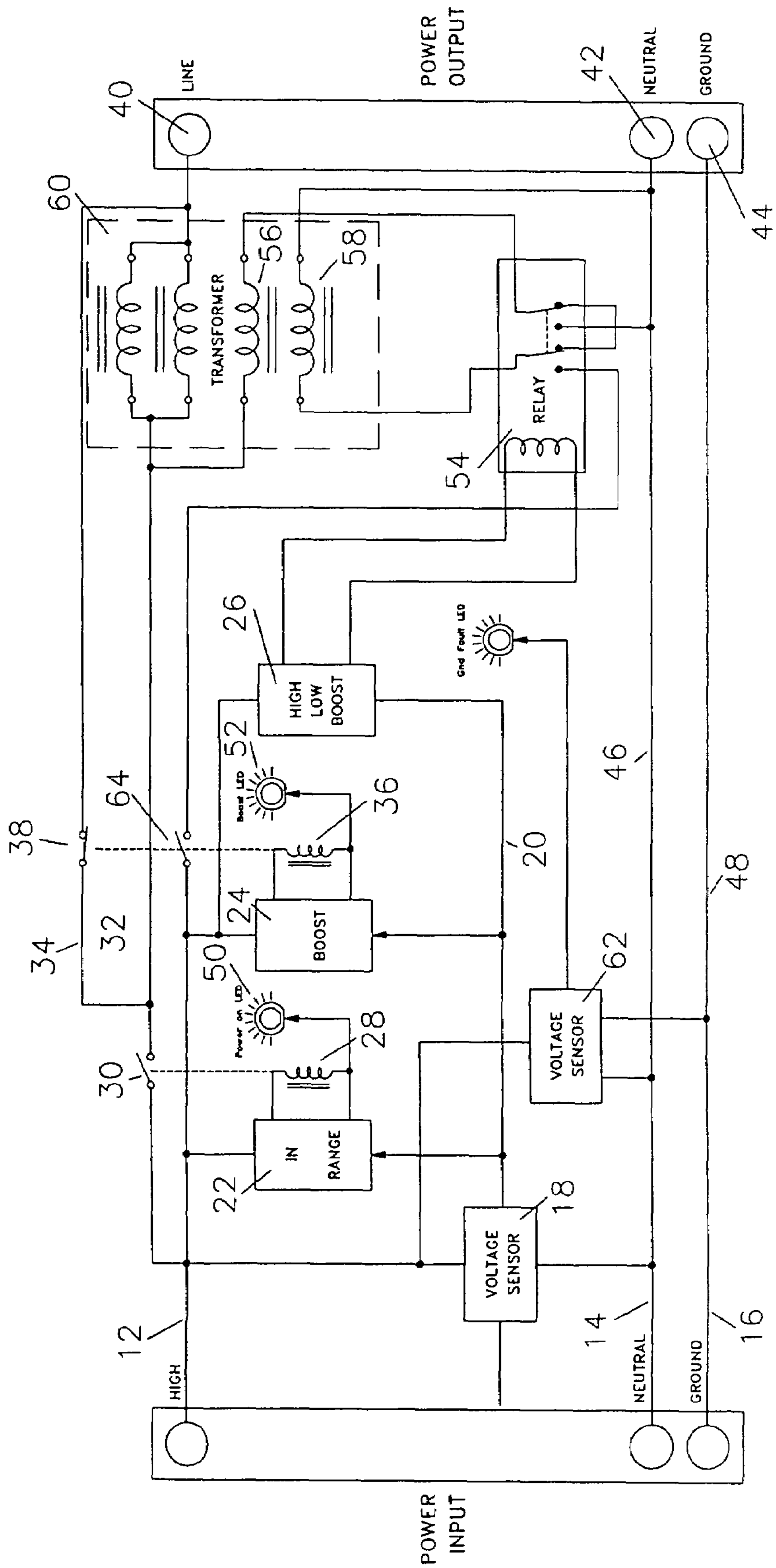
FIG. 1 is a function block diagram of the circuit apparatus of the present invention.

The present invention has its most advantageous application in providing compensation for electrical compensation for source voltage variation as supplied to so-called RV s (recreation vehicles). An RV has electrical equipment that can be typically found in a domestic home and in regard to which in the United States will be provided 120 VAC service voltage which preferably lies within the range of 115–125 VAC in order to efficiently and safely operate domestic home electrical appliances and equipment. It has also been found that since an RV frequently taps into public electrical service at remote points from source voltage generation that actual source voltage experienced at the RV may vary from 90–130 VAC at different times of the day. Although not confined in this regard, for clarity of presentation, the description of the preferred embodiment will be given for a typical 120 VAC source voltage varying as indicated.

In its broadest aspects, the circuit apparatus of this invention is electrical inserted between a source voltage and an RV electrical inlet by conventional cabling and connectors of the male and female category, which circuit apparatus operates automatically to sense the source voltage value and, depending upon the sensed value, provides a low boost voltage, a high boost voltage, or a direct connection of the source voltage to the RV inlet without boost. Apparatus condition lights are provided for visibly indicating the operating state of the circuit apparatus.

Turning now to the drawing and particularly to FIG. 1, an service line input voltage source is interconnected to the circuit apparatus 10 at feed lines 12 (high), 14 (neutral) and 16 (ground) and which hereinafter will be referred to as the source voltage. A first voltage sensor 18 connected across source voltage lines 12 and 14 will provide an actuation signal on line 20 to each of three subcircuits 22 (Out of Range), 24 (No Boost) and 26 (High/Low Boost).

If the source voltage is sensed and found to be within the range of 90–130 VAC, the voltage sensor 18 will provide a signal to the in range circuit 22 to energize relay coil 28 illuminating LED 50 and close contact 30 connecting line 12 to lines 32 and 34. Also, at this time if the source voltage is within the range of 90 to 108 VAC, the voltage sensor 18 will send a signal to the boost circuit 24 causing relay 36 to energize and close contact 64 and open contact 38 causing boost LED 52 to light. The voltage sensor 18 also sends a signal to the high-low boost circuit 26 energizing relay 54. The relay 54 contacts now connect the primary coils 56 and 58 of the transformer 60 in parallel across the source voltage. With primary coils 56 and 58 so-connected, the transformer secondary is at maximum output voltage. This secondary voltage is added to the line voltage to provide high boost at output terminals 40 and 42.

With input voltage lying within the range of 108–116 VAC, voltage sensor 18 will supply a signal to the in-range circuit 22 energizing relay 28 and closing contact 30. Voltage sensor 18 will also at this time send a signal to the boost circuit 24 causing relay 36 to close contact 64 and open contact 38 while lighting boost LED 52. Voltage sensor 18 will also at this time supply a signal to the high-low boost circuit 26 causing relay 54 to become deenergized. With relay 54 deenergized, the transformer primary windings 56 and 58 will be series connected across the source voltage providing the lowest output value the transformer secondary. The secondary voltage when added to the source voltage produces low-boost across terminals 40 and 42.

When the source voltage is within 116–130 VAC, voltage sensor 18 supplies a signal to the in-range circuit 22 energizing relay 28 to close contact 30. Voltage sensor 18 at this time also supplies a further signal to the boost circuit deenergizing relay 36 which opens contact 64 therby removing the source voltage from the transformer and at the same time closes contact 38 which bypasses the transformer secondary output. Now, the voltage appearing across terminals 40 and 42 follows the source voltage.

In the event the source voltage is outside the range 90–130 VAC, i.e., either greater than 130 VAC or less than 90 VAC, voltage sensor 18 provides a signal to the in-range circuit causing relay 28 to drop out and contact 30 to open disconnecting the output from the source voltage.

As a safety feature, the invention includes a further voltage sensor 62 that monitors all three of the input lines, namely, High, Neutral and Ground. In the event Ground has become disconnected, if High and Neutral haveen interchanged, or High and Ground have been interchanged, an indicator light 63 is energized. In this way the user can take appropriate steps to correct the problem and prevent the possibility of damage occurring.

Although the invention is described in connection with a preferred embodiment, it is understood that those skilled in the appertaining arts may make modifications that come within the spirit of the invention as described herein and within the ambit of the appended claims.

What is claimed is:

1. Apparatus for automatically providing electrical voltage output in three different magnitudes responsive to three ranges of source voltage values, comprising:

a transformer including first and second primary windings and a secondary winding;

a voltage sensor interconnected with the source voltage and energized to provide a first signal on the source voltage being within the range 90–130 VAC, a second signal when the source voltage is within the range 90–108 VAC, a third signal when the source voltage is within the range 108–116 VAC, a fourth signal when the source voltage is within 116–130 VAC, and a fifth signal when the source voltage is outside the range 90–130 VAC;

an in-range control is actuated by each of the first, second, third and fourth signals to energize a first relay having contacts that interconnect the source voltage with the transformer and the in-range control is actuated by the fifth signal to deenergized the first relay disconnecting the source voltage from the transformer;

the voltage sensor second signal is connected to a boost control and a high-low control energizing second and third relays closing contacts that interconnect the primary windings in parallel providing maximum transformer output added to the source voltage;

the voltage sensor third signal is connected to the boost control and high-low boost energizing the second relay to close contacts interconnecting source voltage to the transformer primary and dropping out the third relay to connect the primary windings in series providing a low boost to the source voltage; and the voltage sensor fourth signal also acts on the boost control to drop out the second relay which drops out the third relay and provides a direct connection between the source voltage and the apparatus output.

2. Apparatus as in claim 1, in which a power-on indicator is energized to light when the first relay is energized.

3. Apparatus as in claim 1, in which a boost indicator is energized to light when the second relay is energized.

4. Apparatus interconnecting a source voltage and an output voltage to an RV vehicle and automatically supplying two levels of boost across output voltage terminals on the source voltage dropping below first and second prescribed value ranges, comprising:

a transformer having a secondary winding providing output voltage and first and second primary windings having terminals enabling selective series and parallel interconnection;

means responsive to source voltage values for selectively interconnecting the terminals of the primary windings in series responsive to a first source voltage range and in parallel responsive to a second source range to effect corresponding levels of boost voltage to the output voltage; and means responsive to a third source voltage range for directly connecting source voltage to the output voltage terminals.

5. Apparatus as in claim 4, means responsive to High, Neutral and Ground source lines to light a warning light if the Ground line is disconnected, High and Neutral lines are interchanged, or High and Ground lines are interchanged.

* * * * *